United States Patent [19]

Feutrel

[11] Patent Number: 4,551,300
[45] Date of Patent: Nov. 5, 1985

[54] NUCLEAR REACTOR FUEL ASSEMBLY END FITTING

[75] Inventor: Claude Feutrel, Vauhallan, France

[73] Assignee: Commissariat a l'Energie Atomique, Paris, France

[21] Appl. No.: 456,739

[22] Filed: Jan. 10, 1983

[51] Int. Cl.[4] .............................................. G21C 3/30
[52] U.S. Cl. ................................ 376/364; 376/285; 248/584; 267/15 R; 267/154
[58] Field of Search ............... 376/364, 365, 362, 363, 376/285; 248/608, 584, 591, 594; 267/15 R, 57, 154, 160, 162, 70, 71, 72

[56] References Cited

U.S. PATENT DOCUMENTS

| | | | |
|---|---|---|---|
| 2,821,239 | 1/1958 | Brendel | 248/584 |
| 2,939,663 | 6/1960 | Suozzo | 267/162 X |
| 3,693,470 | 9/1972 | Masuyama | 267/57 X |
| 3,771,499 | 11/1973 | Marroni, Jr. et al. | 376/285 X |
| 4,072,562 | 2/1978 | Sankovich | 376/364 |
| 4,072,564 | 2/1978 | Jabsen | 376/364 X |
| 4,134,790 | 1/1979 | Bevilacqua et al. | 376/364 |
| 4,265,010 | 5/1981 | Doss et al. | 376/362 X |
| 4,268,357 | 5/1981 | Formarek et al. | 376/364 |
| 4,278,501 | 7/1981 | Steinke | 376/364 |

FOREIGN PATENT DOCUMENTS

| | | |
|---|---|---|
| 1439936 | 9/1969 | Fed. Rep. of Germany . |
| 1159971 | 7/1969 | United Kingdom . |

Primary Examiner—Deborah L. Kyle
Assistant Examiner—Dan Wasil

[57] ABSTRACT

End fitting for the fuel assembly of a nuclear reactor comprising in per se known manner a device for holding the fuel assembly against an upper or lower plate of the reactor core, wherein the maintaining device is constituted by a plurality of rigid levers, having a first end and a second end, each lever being articulated on an axis A, a closed recess provided in the sides of a frame of the end fitting for each lever and elastic means contained in the recesses and exerting a restoring torque on the corresponding lever.

7 Claims, 5 Drawing Figures

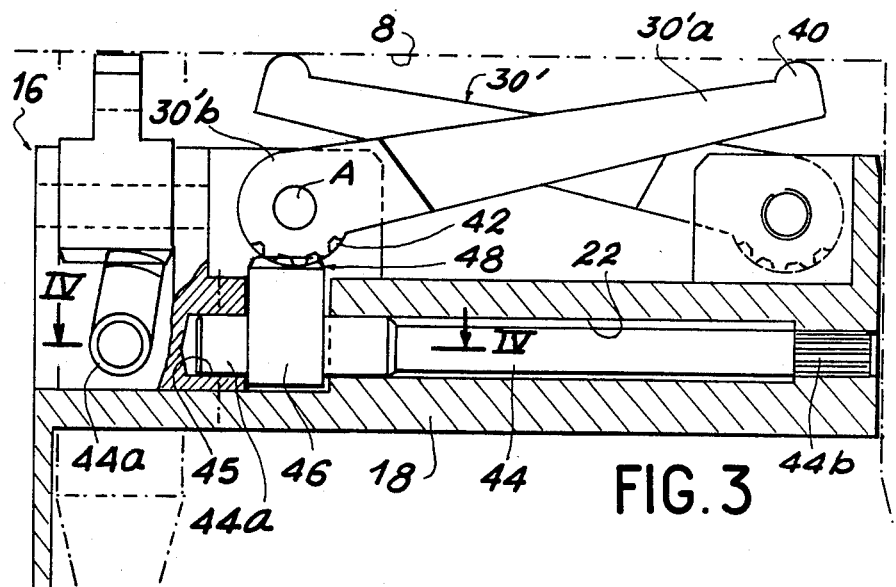
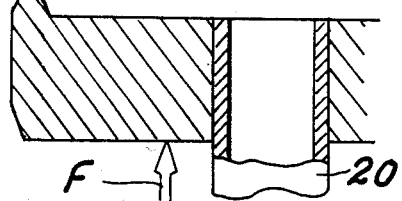
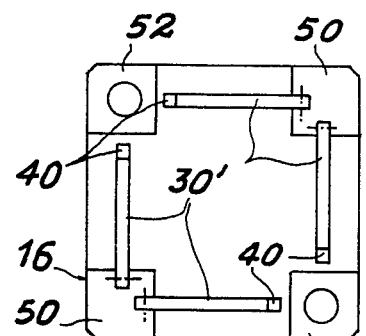
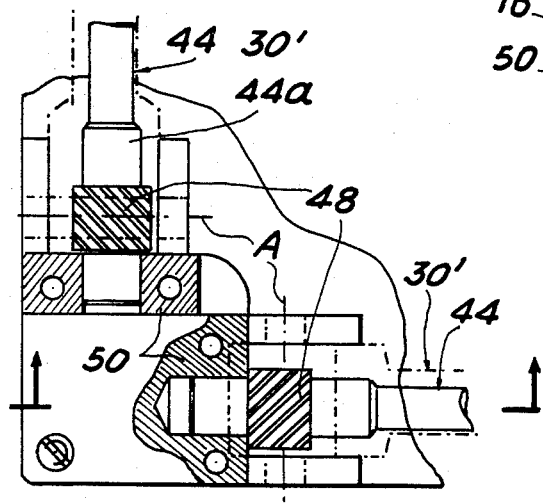

NUCLEAR REACTOR FUEL ASSEMBLY END FITTING

BACKGROUND OF THE INVENTION

The present invention relates to an end fitting for a fuel assembly of a nuclear reactor comprising an elastically drawn back rigid lever.

The fuel assemblies of water-cooled nuclear reactors generally comprise rigid end fittings, namely a lower end fitting and an upper end fitting, fixed to each end of rigid guide tubes. The guide tubes carry a plurality of spacing grids, which maintain in place a group of fuel rods.

Assemblies of this type, when fitted into the reactor core, are positioned between an upper plate and a lower plate forming part of the structure placed in the reactor vessel. They are longitudinally swept from bottom to top by a cooling water stream. The difference between the thermal expansion coefficients of the materials used in the nuclear reactor structure prevents the rigid fixing of fuel assemblies to the upper and lower plates of the core structure.

Thus, it is conventional practice to place between each assembly and one of the core plates, generally the upper plate, an elastic fixing member, which forces back the assembly against the opposite plate.

However, the problem exists of the fracture of the elastic fixing member, because the broken part thereof can be carried along by the heat-transfer fluid and will lead to damage in the cooling water circuit. Solutions have already been proposed for eliminating this problem. For example, U.S. Pat. No. 4,072,562 granted Feb. 7, 1978 relates to a device having combined flexion and torsion springs mounted in the end fitting of the assembly. The spring is formed by a first flexion arm held in a cavity, a torsion arm and a second flexion arm exerting pressure on a projection of the grid plate.

The torsion arm which is most likely to break is covered with a protective metal sheet serving to prevent broken spring fragments from entering the primary cooling fluid circuit. For the same purpose, the second flexion arm is terminated by a material back-flow, which is displaced in a guidance slot.

Thus, in this device, the problem of the breaking of springs has been considered and a solution proposed for preventing a broken part of the spring from being carried along in the heat-transfer fluid, causing damage in the cooling water circuit. However, in spite of the fact that therefore at the part of the spring working in torsion and which is most likely to break has been covered with a protective sheet, another weak point exists at the bottom of the second flexion lever. This part, which has a constant section, works both in flexion and in torsion, whilst the bending stress is at a maximum level there, because it is at a maximum distance from the point by which the force of the spring is transmitted. Finally, it is curved, which further contributes to the weakening thereof.

Thus, a fracture can take place at the base of the second torsion arm, which will then be carried along by the cooling fluid and can even leave the slot as a result of its agitation in the cooling fluid. However, even if the broken part of the flexion arm remains in the slot as a result of the material backflow, its displacement may cause damage.

BRIEF SUMMARY OF THE INVENTION

The invention therefore relates to an end fitting for a nuclear reactor fuel assembly comprising an elastic fixing member, which obviates the aforementioned disadvantage. This member is formed on the one hand by a rigid lever and on the other hand by elastic means contained in a recess and which exert a restoring torque on the rigid lever. Thus, there is a separation between the elastic means giving rise to the restoring force and the means transmitting this force to the grid plate of the core. The stresses present in the lever are sufficiently low to ensure that the lever is not liable to break. The elastic means which may fracture are confined in a recess, so that no broken part can escape into the heat-transfer fluid.

The invention more specifically relates to an end fitting for the fuel assembly of a nuclear reactor comprising in per se known manner a device for holding the fuel assembly against an upper or lower plate of the reactor core, wherein the maintaining device is constituted by a plurality of rigid levers, having a first end and a second end, each lever being articulated on an axis A, a closed recess provided in the sides of a frame of the end fitting for each lever and elastic means contained in the recesses and exerting a restoring torque on the corresponding lever.

Preferably, the section of the levers decreases from articulation axis A to each of the ends and is determined in such a way that the stresses existing in these levers are constant. Thus, the levers have no weak point.

According to a first embodiment of the invention, the elastic means comprise a rod having a first end and a second end, connected by its first end in pivoting manner to the free end of the lever, very rigid elastic members placed around the rod and a stop member immobilized in translation, at the second end of the rod, whereby on the side of the first end, the recess has a shoulder against which bear the very rigid elastic members.

This construction has the advantage of making it possible to adjust the prestressing of the elastic members by acting on the position of the stop member. Thus, the stop member is, for example, an adjusting nut screwed onto the rod.

According to a second embodiment of the invention, the lever has an inclined toothed gear at its second end and the elastic means are constituted by a torsion bar having a first end and a second end whilst at the first end thereof is provided a toothed segment, whose teeth are inclined in a complementary manner to the teeth of the lever and which mesh therewith, the bar being immobilized in rotation at the second end with respect to the frame of the end fitting, the terminal part of the first end rotating in a bearing provided in said frame.

Thus, in the elastic means, stresses are present as a result of the compression effect in the first embodiment and by the torsion effect in the second embodiment.

BRIEF DESCRIPTION OF THE DRAWINGS

The invention is described in greater detail hereinafter relative to non-limitative embodiments and with reference to the attached drawings, wherein show:

FIG. 3 a larger-scale sectional view of a nuclear reactor fuel assembly showing a second embodiment of the invention.

FIG. 4 a section along axis 4—4 of FIG. 3 showing a detail of the end of the torsion bars constituting the elastic members of the embodiment of FIG. 3.

FIG. 5 a plan view of the assembly of FIGS. 3 and 4.

DETAILED DESCRIPTION OF THE PREFERRED EMBODIMENTS

Figure 1:
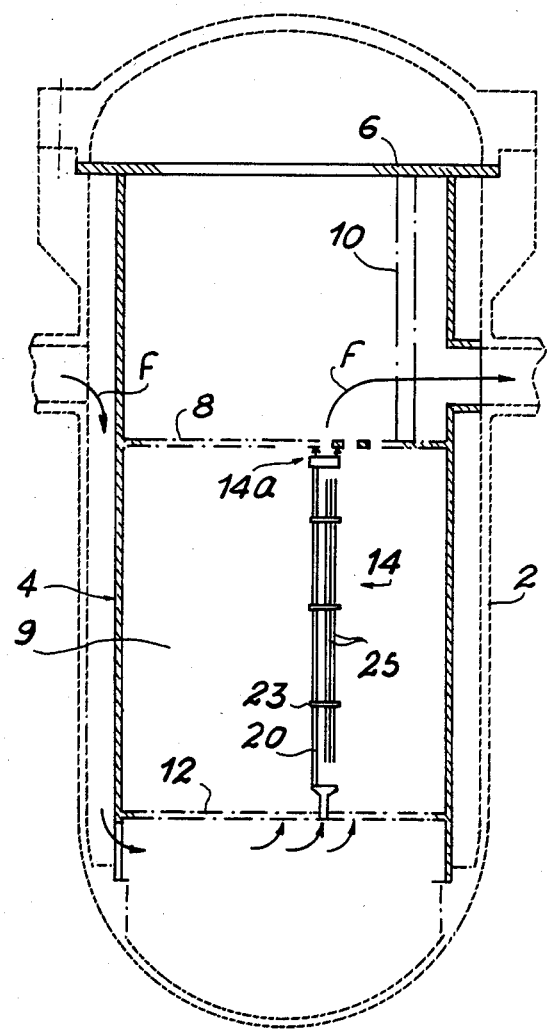
FIG. 1 a diagram relating to the installation of fuel assemblies in the core of a water-cooled nuclear reactor.

FIG. 1 shows the known arrangement of the fuel assemblies of a water-cooled reactor, whose vessel is designated by 2. The internal equipment 4 is suspended within vessel 2 and said equipment is broken down into upper internal equipment constituted by an upper plate 6 and a lower plate 8, interconnected by spacers 10, and lower internal equipment constituted by a lower plate 12. The fuel assemblies, such as assembly 14, forming the core 9 of the nuclear reactor are positioned between plates 8 and 12. A cooling water stream circulates in the direction of arrows F and sweeps over the fuel assemblies 14 from bottom to top.

Figure 2:
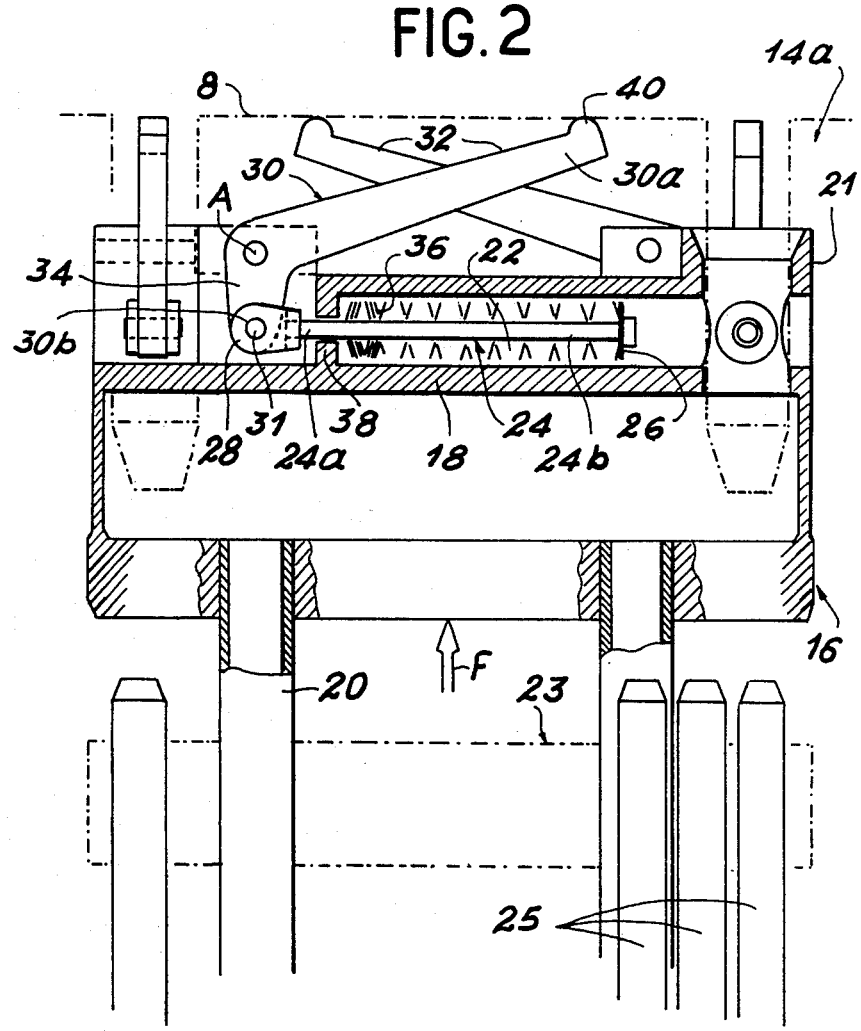
FIG. 2 a longitudinal sectional view of a nuclear reactor assembly showing a first embodiment of the invention.

As can be seen in greater detail in FIG. 2, a fuel assembly such as assembly 14 is constituted by an upper end fitting 16, a not shown lower end fitting and whereby said end fittings are rigidly interconnected by guide tubes 20, whereof only two are shown in FIG. 2 in order not to overload the drawing. To guide tubes 20 are fixed spacing grids, like grid 23, which are shown by dot-dash lines, which maintain the fuel rods 25 in the form of a parallel bundle.

Due to the differences in the expansion coefficients between the materials from which are made on the one hand the fuel assemblies 14 and on the other the internal structures of the vessel, it is not possible to rigidly fix the assemblies to the upper and lower plates 8, 12 respectively. Thus, a clearance is left either between the upper part of assembly 14 and plate 8, or optionally between the lower part of said assembly and grid 12. At the other end of the fuel assembly is arranged an elastic member having the function of engaging the assembly with the opposite plate. The invention specifically relates to an elastic member of this type in which the elastic function giving rise to the force necessary for the engagement of the assembly and the means for transmitting this force are separated. A first embodiment of the invention is shown in FIG. 2.

The upper end member 16 has a plate 18 to which are fixed guide tubes 20. There is also a square frame 21, within whose sides are provided horizontal recesses 22 and which is fixed to plate 18. A rod 24 is arranged within each recess 22. At one of its ends, namely end 24b, rod 24 has a stop nut 26, which is immobilized in translation. At its other end, namely end 24a, is fixed a yoke 28.

A lever 30 pivots about a horizontal axis A with respect to the square frame 21. Lever 30 has a first lever arm 32 and a second lever arm 34. As can be seen, the length of lever arm 32 is many times greater than that of lever arm 34. Yoke 28 is articulated to lever arm 34 by a spindle 31. Very rigid elastic members, such as for example cupped washers 36, are placed on rod 34 and bear against stop nut 26 and at the other end against a shoulder 38 of recess 22.

The terminal portion of lever arm 32 is terminated by a rounded boss 40 which, in the represented embodiment, bears on the upper plate 8, indicated by dot-dash lines, when the fuel assembly is in place. Four identical devices are arranged on each of the four sides of the square frame 21, as can be seen in FIG. 2. This drawing shows two levers 32 in profile and two other levers from the end.

It is obvious that the elastic device described hereinbefore could also be positioned at the lower end of the fuel assembly. This would obviously imply an appropriate dimensioning, in order to take account of the weight of the fuel assembly. In this case, boss 40 would bear against the lower plate of core 12.

This construction of the elastic maintaining device would make it possible in the case of the fracture of rod 24 or the cupped washer 36 to prevent any piece entering the primary cooling circuit. Thus, these pieces would remain confined within recess 22.

The cross-section of lever 30 has been designed in such a way that the stresses are well below those existing in washers 36 of rod 24. Furthermore, its section is larger on moving towards axis A, where the bending stresses are highest. The stresses in lever 30 are consequently low and constant, so that it is very unlikely to break and its deflection is negligible.

FIGS. 3 to 5 show a second embodiment of the elastic maintaining device according to the invention.

FIG. 3 shows the upper part of a fuel assembly 14, shown on a larger scale than in FIG. 2. It is possible to see guide tube 20, plate 18, square frame 21 and recess 22 made in the latter, together with lever 30'.

Lever 30' pivots about a horizontal axis A located at its end 30'b. On end 30b is cut teeth inclined by 45°, whilst it has a boss 40 at its other end 30a.

Within the recess 22 is provided a torsion bar 44, whose grooved end 44b is immobilized in rotation with respect to square frame 21. At its other end 44a, torsion bar 44 can freely pivot within a blind hole 45 made in square frame 21. This hole prevents any overhang of the torsion bar. At the same end 44a, there is a segment 46 integral with torsion bar 44 and on which is cut a toothed gear 48, which meshes with toothed gear 42 made in lever end 30'b.

Thus, torsion bar 44 exerts a torque enabling lever 30 to be drawn upwards. Four of these levers are placed on end fitting 16. Thus, they exert a maintaining force, by means of bosses 40, on the upper plate 8 (not shown in FIG. 3).

FIG. 4 shows the ends 44a of two torsion bars. Each of these ends 44a is mounted in a removable bearing 50. The bars are fitted in pairs, so as to enable the installation of centering pins 52 in the corners or angles which are left free.

I claim:

1. A nuclear reactor fuel assembly end fitting comprising a frame having sides, a closed recess provided in each side of said frame, elastic means contained in each closed recess, a plurality of elongate levers, the number of levers being equal to the number of sides of the frame, each lever having a first end adapted to bear against a reactor vessel element and a second end, said lever being spaced from said elastic means, the cross-section of the lever increasing from said first end to said second end for maintaining stress per unit of lever cross-sectional area essentially constant, pivot axis forming means pivotally connected to each lever between said lever first and second ends and mounted on said frame for pivotally connecting each lever to said frame, coupling means connecting each of said lever second ends to a corresponding elastic means and spacing each of said levers from said corresponding elastic means for separating each of said levers from said corresponding elastic means, said elastic means exerting a restoring torque on the corresponding lever via said coupling means.

2. An end fitting according to claim 1, wherein the cross-section is determined in such a way that the stresses existing in said levers are constant.

3. An end fitting according to claim 1, wherein the elastic means includes a rod having a first end and a second end, and a plurality of elastic members mounted on said rod, said coupling means connecting said rod first end in pivoting manner to the second end of the lever, and elastic members placed around the rod, and a stop member immobilized in translation at the second end of the rod, the recess having a shoulder against which bear the elastic members on the side of the first end of the rod, said coupling means including a spindle attached to each lever near said lever second end and a yoke attached to said spindle, said rod being located essentially entirely within said recess and connected at said rod first end to said yoke to be pivotally connected to said spindle.

4. An end fitting according to claim 3, wherein the stop member can undergo positional adjustment on the rod, so as to regulate the prestress of the elastic members.

5. An end fitting according to claim 4, wherein the stop member is a nut screwed onto the rod and bearing on the elastic members.

6. An end fitting according to claim 3, wherein the elastic members are cupped washers.

7. An end fitting according to claim 1, wherein the lever has an inclined toothed gear at its second end and the elastic means are constituted by a torsion bar having a first end and a second end, whilst at the first end thereof is provided a toothed segment, whose teeth are inclined in a complementary manner to the teeth of the lever and which mesh therewith, the bar being immobilized in rotation at the second end with respect to the frame of the end fitting, the terminal part of the first end rotating in a bearing provided in said frame.

* * * * *